| (12) | United States Patent | (10) Patent No.: | US 9,398,719 B2 |
|---|---|---|---|
| | Westby et al. | (45) Date of Patent: | Jul. 19, 2016 |

(54) CENTER PIVOT SWING-OUT WALL RACK

(71) Applicant: Hoffman Enclosures, Inc., Anoka, MN (US)

(72) Inventors: Nathan L. Westby, Zimmerman, MN (US); William Anderson, Ramsey, MN (US); Jeremy Fink, Anoka, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 2 days.

(21) Appl. No.: 14/668,473

(22) Filed: Mar. 25, 2015

(65) Prior Publication Data

US 2015/0201523 A1 Jul. 16, 2015

Related U.S. Application Data

(63) Continuation of application No. 14/028,363, filed on Sep. 16, 2013.

(60) Provisional application No. 61/700,974, filed on Sep. 14, 2012.

(51) Int. Cl.
```
A47F 7/00      (2006.01)
H05K 7/18      (2006.01)
F16M 11/18     (2006.01)
F16M 11/20     (2006.01)
```
(Continued)

(52) U.S. Cl.
CPC ............. *H05K 7/18* (2013.01); *F16M 11/18* (2013.01); *F16M 11/2092* (2013.01); *F16M 13/02* (2013.01); *F16M 13/022* (2013.01); *A47F 5/00* (2013.01); *A47F 5/08* (2013.01); *Y10T 29/49959* (2015.01)

(58) Field of Classification Search
CPC ..... H05K 7/18; F16M 11/18; F16M 11/2092; F16M 13/02; F16M 13/022; Y10T 29/49959; A47F 5/00; A47F 5/08
USPC .......... 211/26, 169, 168, 165, 163, 175; 49/388, 390, 392, 393; 312/245, 246, 312/248; 40/734
See application file for complete search history.

(56) References Cited

U.S. PATENT DOCUMENTS 655,897 A * 8/1900 Essig .............................. 49/256
756,006 A * 3/1904 Essig .............................. 49/255

(Continued)

FOREIGN PATENT DOCUMENTS

CA 2831602 A1 3/2014

OTHER PUBLICATIONS

International Search Report; Mailing Date: Feb. 18, 2014; 13 pages.

*Primary Examiner* — Joshua J Michener
*Assistant Examiner* — Devin Barnett
(74) *Attorney, Agent, or Firm* — Quarles & Brady LLP

(57) ABSTRACT

Embodiments of the invention provide a swing-out wall rack for mounting electrical equipment. The swing-out wall rack can include a frame configured to couple to a wall and a rack. The frame can include a vertical member and a horizontal arm. The rack can extend a width and a height. The rack can include a first side and a second side, the second side being opposite from the first side. The rack can further include a mid-point, the mid-point being approximately equidistant from the first side and the second side. The rack can be rotatably coupled to the horizontal arm of the frame substantially about the mid-point of the rack.

17 Claims, 10 Drawing Sheets

(51) Int. Cl.
*F16M 13/02* (2006.01)
*A47F 5/08* (2006.01)
*A47F 5/00* (2006.01)

(56) References Cited

U.S. PATENT DOCUMENTS

| | | | | |
|---|---|---|---|---|
| 764,955 | A * | 7/1904 | McGinness | 49/256 |
| 835,098 | A * | 11/1906 | Christenson | 49/4 |
| 892,954 | A * | 7/1908 | Hanson | 434/421 |
| 949,915 | A * | 2/1910 | Schreiber | 211/41.16 |
| 1,141,274 | A * | 6/1915 | Skall | 312/310 |
| 1,448,664 | A * | 3/1923 | Hull | 40/493 |
| 1,562,975 | A * | 11/1925 | Leake | 211/28 |
| 1,614,564 | A * | 1/1927 | Lynch | 49/161 |
| 1,744,647 | A * | 1/1930 | Lamar | G09F 7/00 40/493 |
| 1,835,042 | A * | 12/1931 | Hammer | 312/227 |
| 2,288,732 | A * | 7/1942 | Nickerson | 40/734 |
| 2,310,312 | A * | 2/1943 | Philipsberg | 49/162 |
| 2,701,928 | A * | 2/1955 | Keenan et al. | 40/479 |
| 2,730,322 | A * | 1/1956 | Johner et al. | 248/127 |
| 2,888,718 | A * | 6/1959 | Gilles-Joseph Francotte | 49/504 |
| 2,889,591 | A * | 6/1959 | Pratt | 49/390 |
| 2,923,417 | A * | 2/1960 | Sonksen | 211/165 |
| 2,938,247 | A * | 5/1960 | Hagerty | 49/390 |
| 3,195,736 | A * | 7/1965 | Bomar, Jr. | 211/163 |
| 3,420,381 | A * | 1/1969 | Bradfield | 211/26 |
| 3,676,955 | A * | 7/1972 | Schacht | 49/192 |
| 3,759,396 | A | 9/1973 | Best et al. | |
| 3,771,264 | A * | 11/1973 | Sawle | 49/390 |
| 3,878,644 | A * | 4/1975 | Brown et al. | 49/67 |
| 3,960,273 | A * | 6/1976 | Weston | 211/4 |
| 3,982,633 | A * | 9/1976 | Pennington | 211/4 |
| 4,093,168 | A * | 6/1978 | Buril | A47F 5/0807 211/57.1 |
| 4,235,048 | A * | 11/1980 | Gillery | 49/390 |
| 4,401,222 | A | 8/1983 | Kulikowski et al. | |
| 4,660,791 | A | 4/1987 | Lisak | |
| 4,875,312 | A * | 10/1989 | Schwartz | 52/144 |
| 5,083,398 | A * | 1/1992 | Kolbeck et al. | 49/395 |
| 5,226,548 | A * | 7/1993 | Koeppel | 211/144 |
| 5,361,538 | A * | 11/1994 | McNabb | 49/192 |
| 5,588,537 | A * | 12/1996 | Hagopian | 211/4 |
| 5,806,687 | A * | 9/1998 | Ballesteros et al. | 211/26 |
| 6,065,612 | A * | 5/2000 | Rinderer | 211/26 |
| 6,112,445 | A * | 9/2000 | Feeney | 40/747 |
| 6,782,649 | B1 * | 8/2004 | Adler | 40/734 |
| 6,811,038 | B1 * | 11/2004 | Sanderson | A47B 81/00 211/13.1 |
| 6,814,244 | B1 * | 11/2004 | Hathcock | 211/26 |
| 6,959,901 | B2 * | 11/2005 | Chang | 248/458 |
| 7,395,996 | B2 * | 7/2008 | Dittmer | 248/291.1 |
| 7,487,943 | B1 * | 2/2009 | Gillespie | 248/282.1 |
| 7,549,246 | B2 * | 6/2009 | Kuo | 40/601 |
| 8,167,256 | B1 * | 5/2012 | Bishop | F16M 11/24 248/200 |
| 8,966,821 | B2 * | 3/2015 | Walker et al. | 49/382 |
| 2001/0008223 | A1 * | 7/2001 | Accatino | 211/169 |
| 2002/0014466 | A1 * | 2/2002 | Maier-Hunke | 211/169 |
| 2004/0206712 | A1 * | 10/2004 | Wicha et al. | 211/95 |
| 2006/0130381 | A1 * | 6/2006 | Caterinacci | 40/607.04 |
| 2007/0204499 | A1 * | 9/2007 | Sudack et al. | 40/734 |
| 2008/0105633 | A1 * | 5/2008 | Dozier et al. | 211/26 |
| 2008/0192442 | A1 * | 8/2008 | Lupton et al. | 361/725 |

* cited by examiner

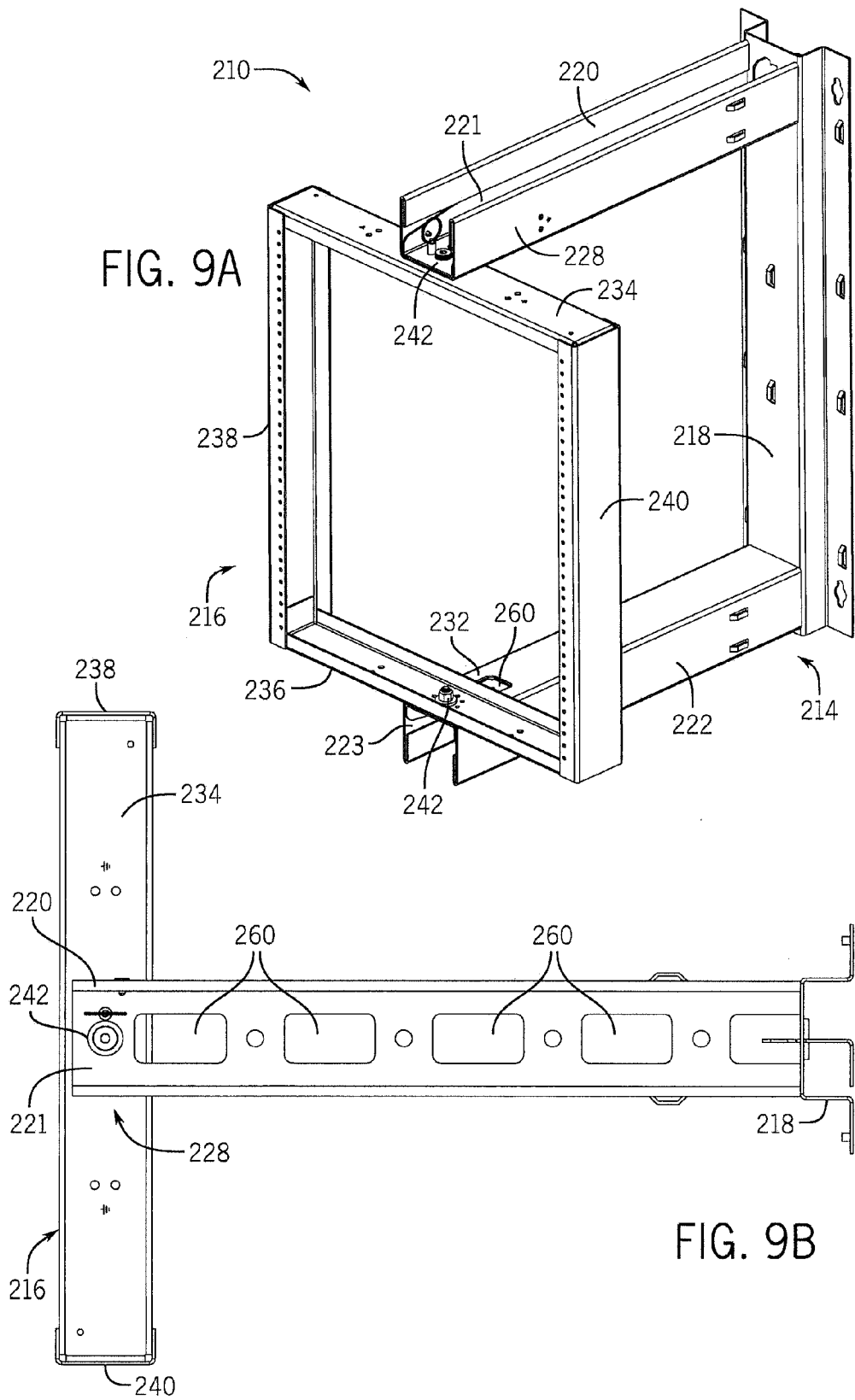

CENTER PIVOT SWING-OUT WALL RACK

CROSS REFERENCE TO RELATED APPLICATIONS

This application claims priority to U.S. Provisional Patent Application No. 61/700,974 filed on Sep. 14, 2012, and U.S. patent application Ser. No. 14/028,363 filed on Sep. 16, 2013, the entire contents of which are incorporated herein by reference.

BACKGROUND

Swing-out racks are used for supporting and organizing a variety of electronic equipment and associated wiring. For example, telecommunications and computer network equipment are commonly housed in a network room that includes several racks for mounting such equipment. The swing-out wall racks provide access to the back side of the electronic equipment for activities including, but not limited to, repair, modification, or upgrades. Often several racks are housed in a network room, where space can be limited. Prior wall racks were often cumbersome and not easily manipulated for different conditions.

SUMMARY OF THE INVENTION

One embodiment of the invention provides a swing-out wall rack for mounting electrical equipment. The swing-out wall rack can include a frame configured to couple to a wall and a rack. The rack can extend a width and a height and can have a first side and a second side. The second side can be opposite from the first side. The rack can further include a mid-point that is approximately equidistant from the first side and the second side. The rack can be rotatably coupled to the frame substantially about the mid-point of the rack.

In another form, the invention provides a swing-out wall rack for mounting electrical equipment. The swing-out wall rack can include a frame configured to couple to a wall and a rack. The rack can include a top side, a bottom side, a first side, and a second side. The top side can be opposite from the bottom side and the first side can be opposite from the second side. The rack can be rotatably coupled to the frame and lockable at more than one rotatable orientation with respect to the frame.

In yet another form, the invention provides for a method of mounting a wall rack to the wall. The method can include providing a mounting hook, the mounting hook including a back surface and a hook portion. The method can further include coupling the mounting hook to the wall in a desired location for the mounting of electrical equipment. Additionally, the method can include providing a wall rack. The wall rack can include a frame configured for mounting to the wall and a rack coupled to the frame. The method can also include mounting the frame of the wall rack on the mounting hook, leveling the wall rack, and coupling the frame to the wall to mount the wall rack to the wall.

These and other features, aspects, and advantages of the present invention will become better understood upon consideration of the following detailed description, drawings, and appended claims.

DESCRIPTION OF THE DRAWINGS

FIG. 9A is a top, right perspective view of a third embodiment of a center pivot swing-out wall rack, where the horizontal telescoping arms are in a retracted position.

FIG. 9B is a top view of the center pivot swing-out wall rack of FIG. 9A.

DETAILED DESCRIPTION

Figure 1:
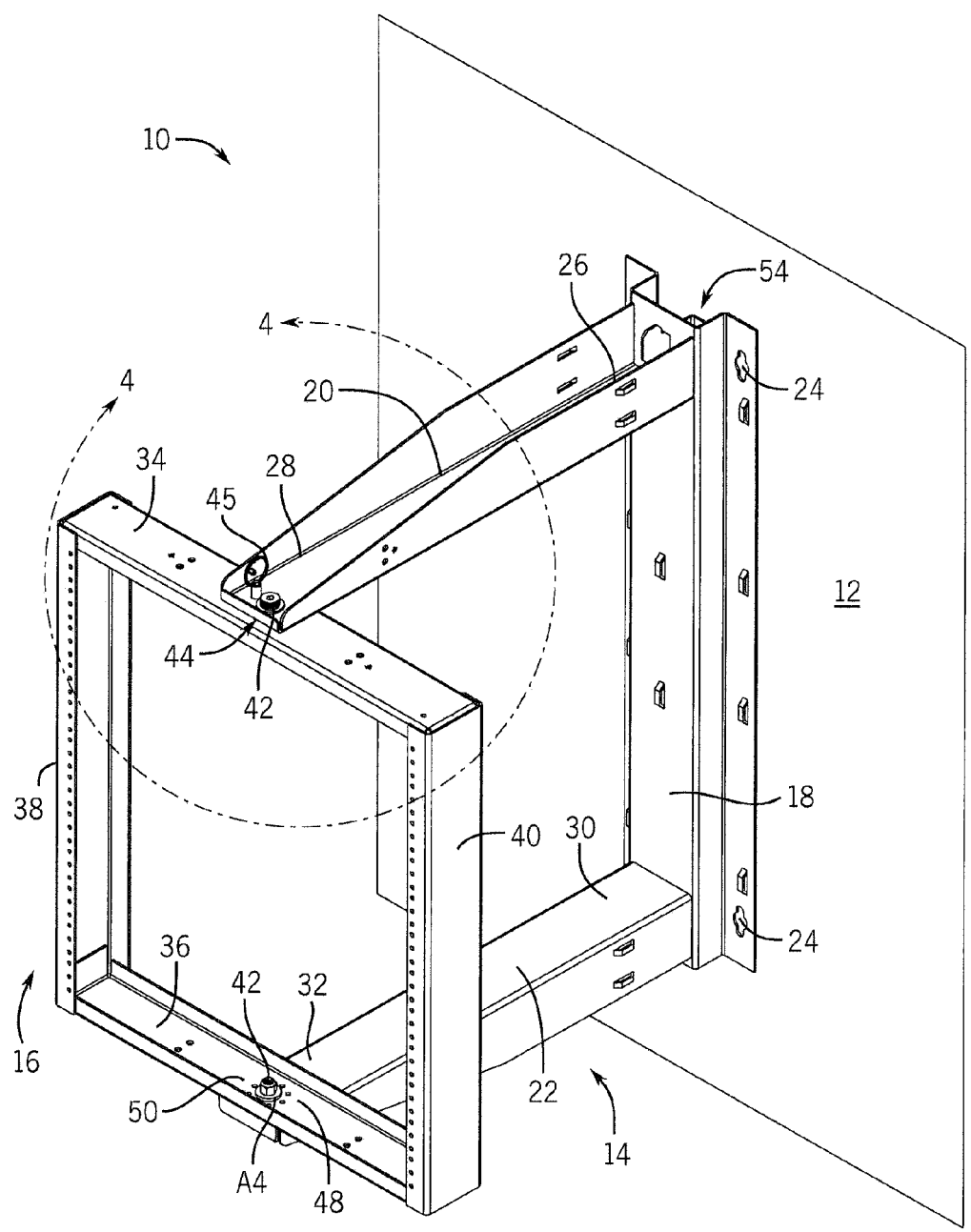
FIG. 1 is a top, right perspective view of a first embodiment of a center pivot swing-out wall rack.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIGS. 1-6 illustrate a swing-out wall rack 10 configured to be coupled to a wall 12. The swing out wall rack 10 can include a frame 14 and a rack 16. The frame 14 can include a vertical member 18, a first horizontal arm 20, and a second horizontal arm 22. The vertical member 18 can be configured to be coupled to a wall 12 or other feature. For example, the vertical member 18 can include several fastener openings 24 through which fasteners (not shown) can couple the frame 14 to the wall 12. As shown in FIG. 1, the first horizontal arm 20 can be spaced apart from the second horizontal arm 22 and substantially parallel to the second horizontal arm 22. The first horizontal arm 20 can include a proximal end 26 and a distal end 28. Similarly, the second horizontal arm 22 can include a proximal end 30 and a distal end 32. The proximal ends 26, 30 can be coupled to the vertical member 18.

Figure 2:
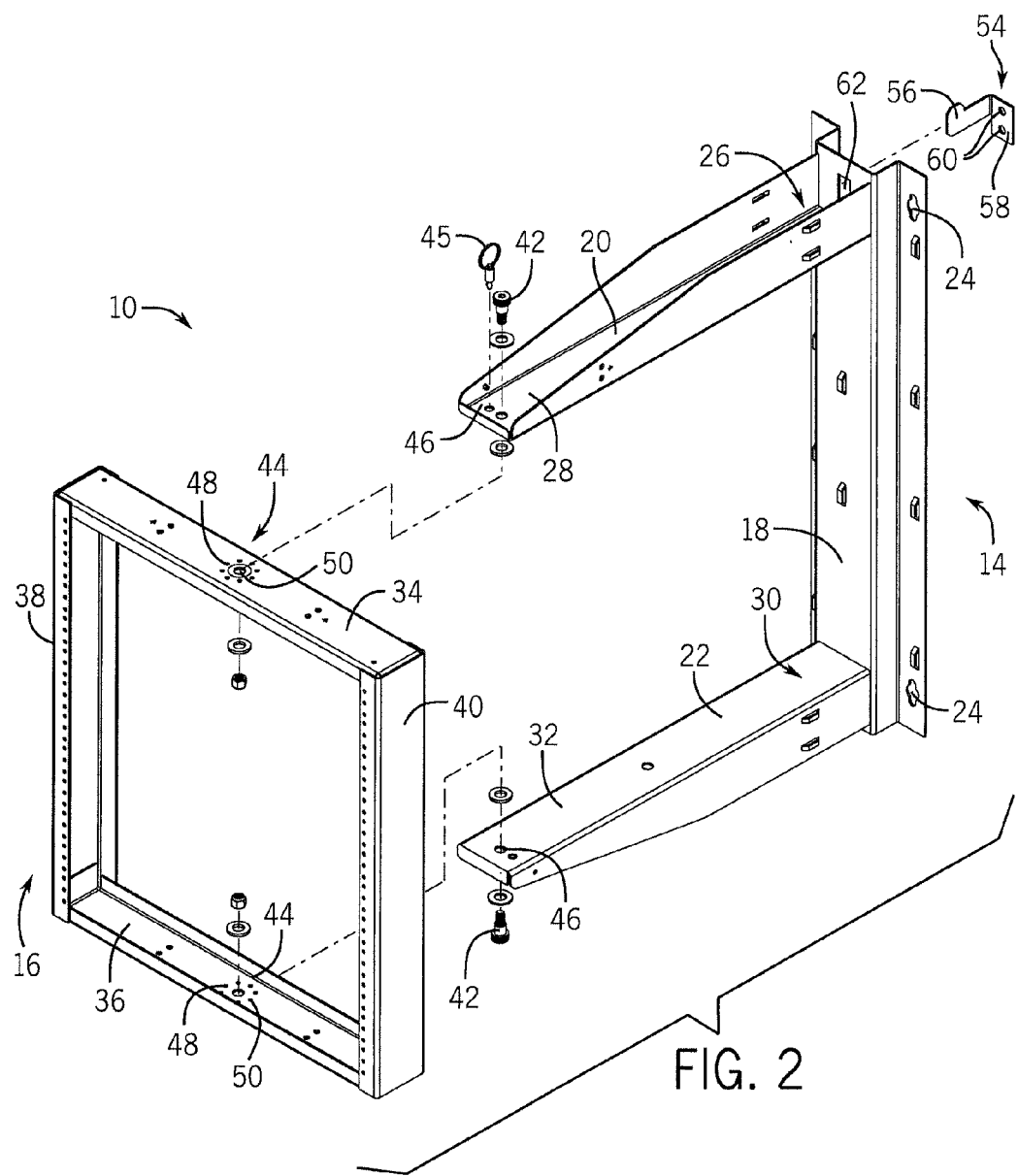
FIG. 2 is an exploded view of the center pivot swing-out wall rack of FIG. 1.
Figure 3:
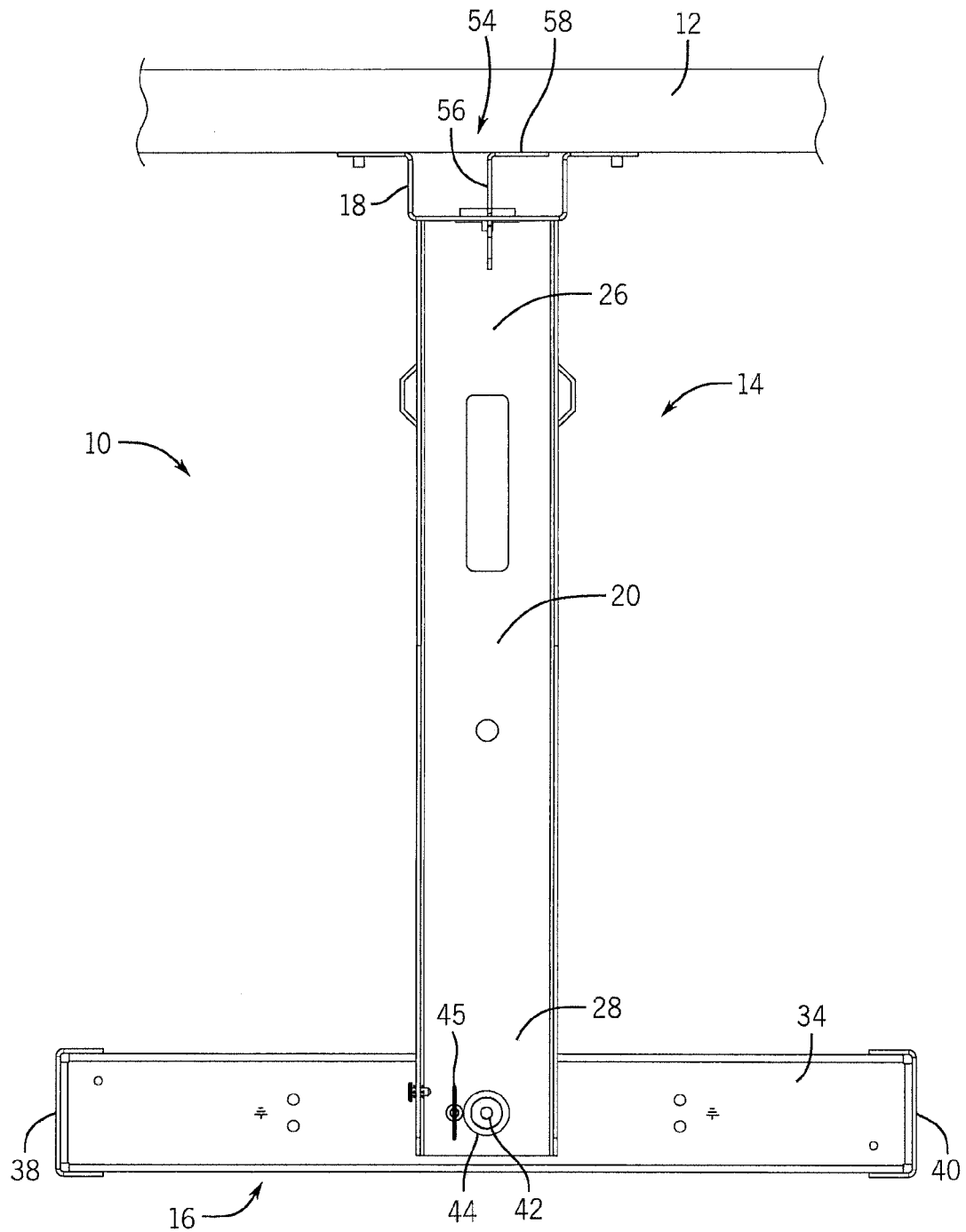
FIG. 3 is a top view of the center pivot swing-out wall rack of FIG. 1.

As illustrated in FIGS. 1-3, the rack 16 can include a top side 34, a bottom side 36, a first side 38, and a second side 40. The second side 40 can be opposite from the first side 38. The distance between the top side 34 and the bottom side 36 can define a height of the rack 16 and the distance between the first side 38 and the second side 40 can define a width of the rack 16. The rack 16 can provide mounting locations for electronic equipment (not shown).

The rack 16 can be coupled to the frame 14. In the embodiment shown in FIGS. 1-3, the rack 16 is coupled to the first horizontal arm 20 and the second horizontal arm 22. The top side 34 of the rack 16 can receive a fastener 42 to couple to the distal end 28 of the first horizontal arm 20. The bottom side 36 of the rack 16 can receive a fastener 42 to couple to the distal end 32 of the second horizontal arm 22. It is contemplated that the rack 16 need not be coupled to both the first horizontal arm 20 and the second horizontal arm 22. Additionally, it is also contemplated that the rack 16 could be modified to be coupled to the frame 14 at the first side 38 and/or the second side 40.

The rack 16 can include a mid-point 44 that is equidistant from the first side 38 and the second side 40. The mid-point 44 can be located on the top side 34 and/or bottom side 36. The mid-point 44 can define the point at which the rack 16 is rotatably coupled to the frame 14. As shown in FIGS. 1-3, the rack 16 can rotate about the mid-point 44 in either a clockwise or counter-clockwise direction. Advantageously, rotating the rack 16 about the midpoint 44 allows equal access to any side 34, 36, 38, 40 of the rack 16. As shown in FIGS. 1-3, the first horizontal arm 20 and the second horizontal arm 22 are long enough such that the rack 16 can rotate about the first horizontal arm 20 and the second horizontal arm 22 at the distal ends 28, 32 a full 360° with respect to the frame 14.

Figure 4:
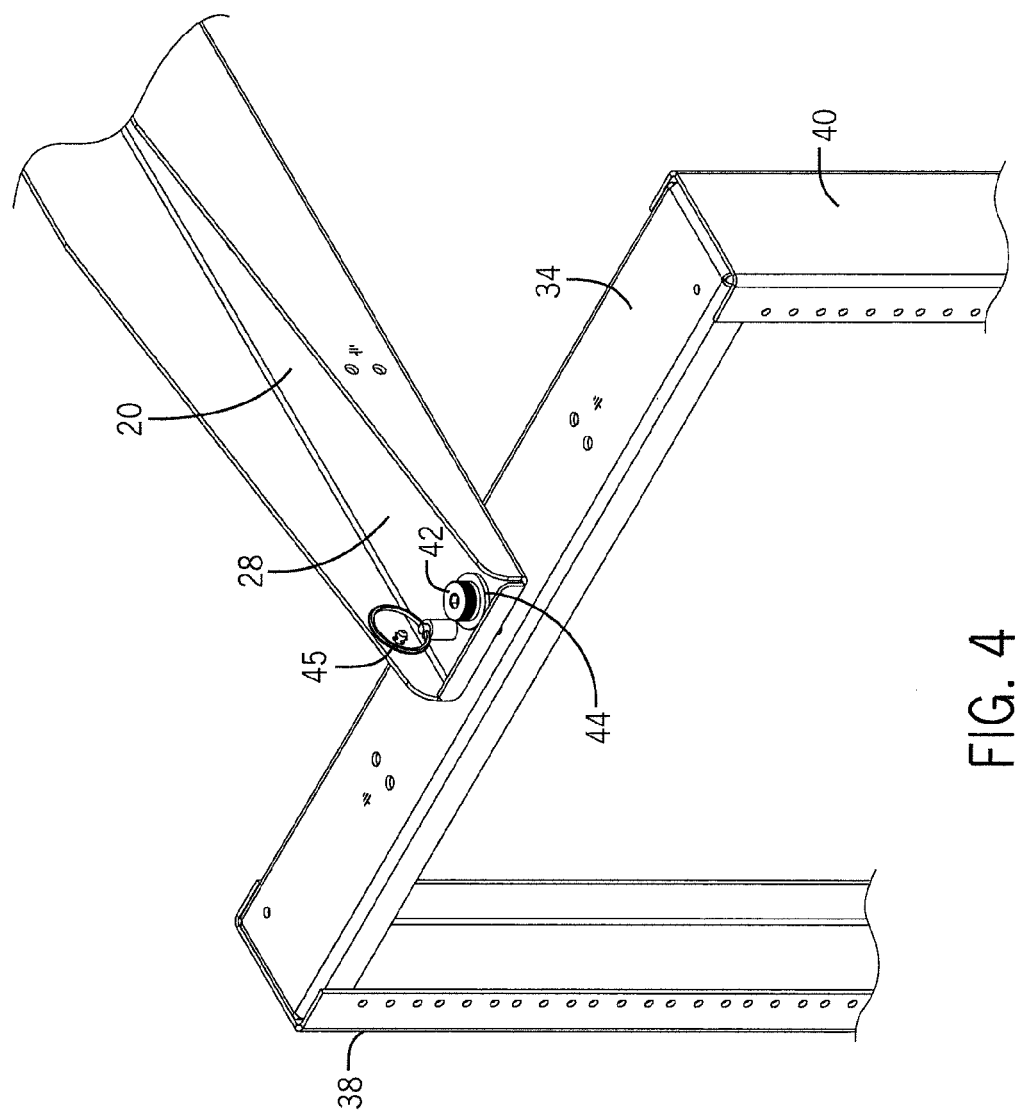
FIG. 4 is a detailed view taken along line 4-4 from FIG. 1.
Figure 5:
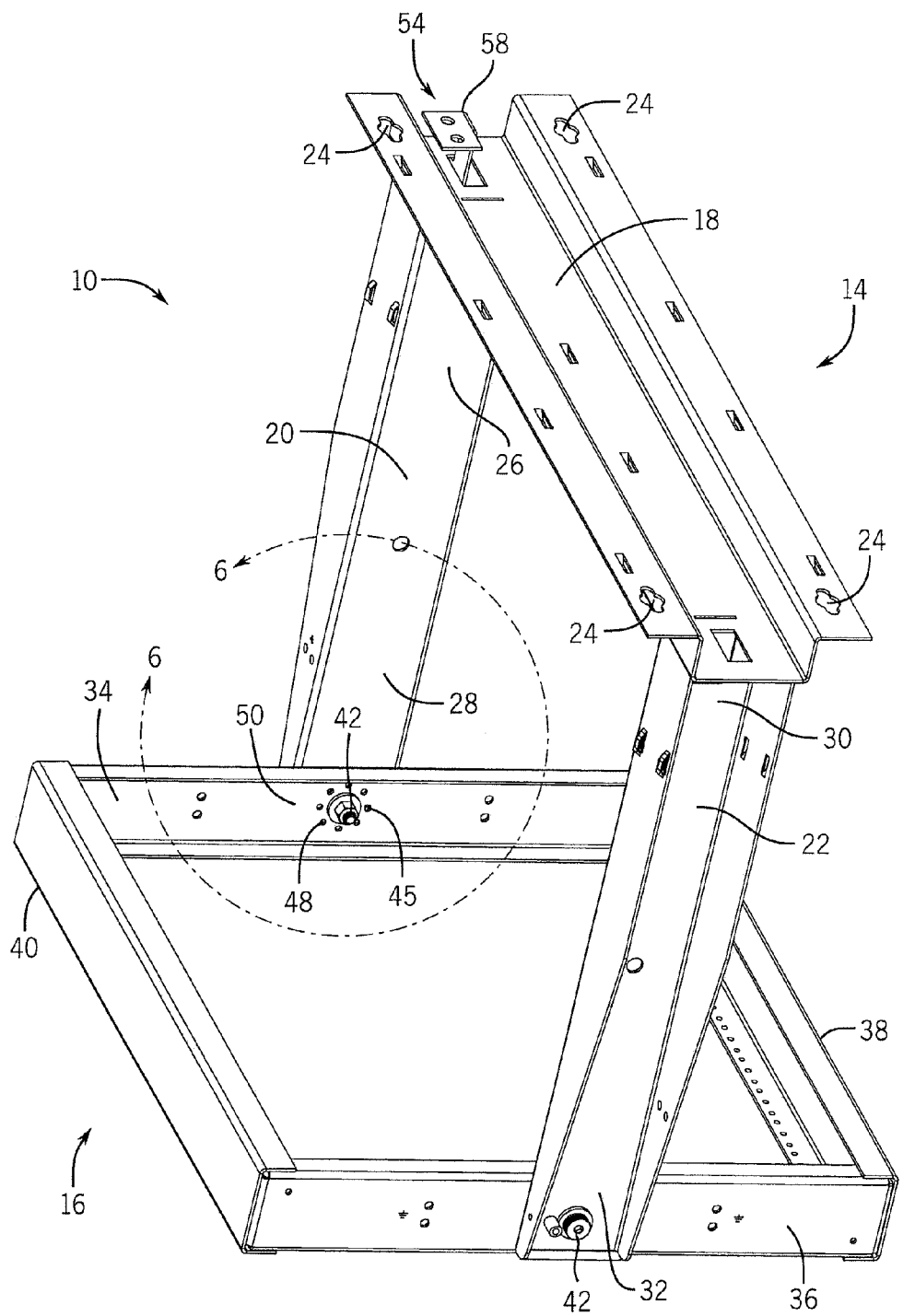
FIG. 5 is a bottom, right perspective view of the center pivot swing-out wall rack of FIG. 1.
Figure 6:
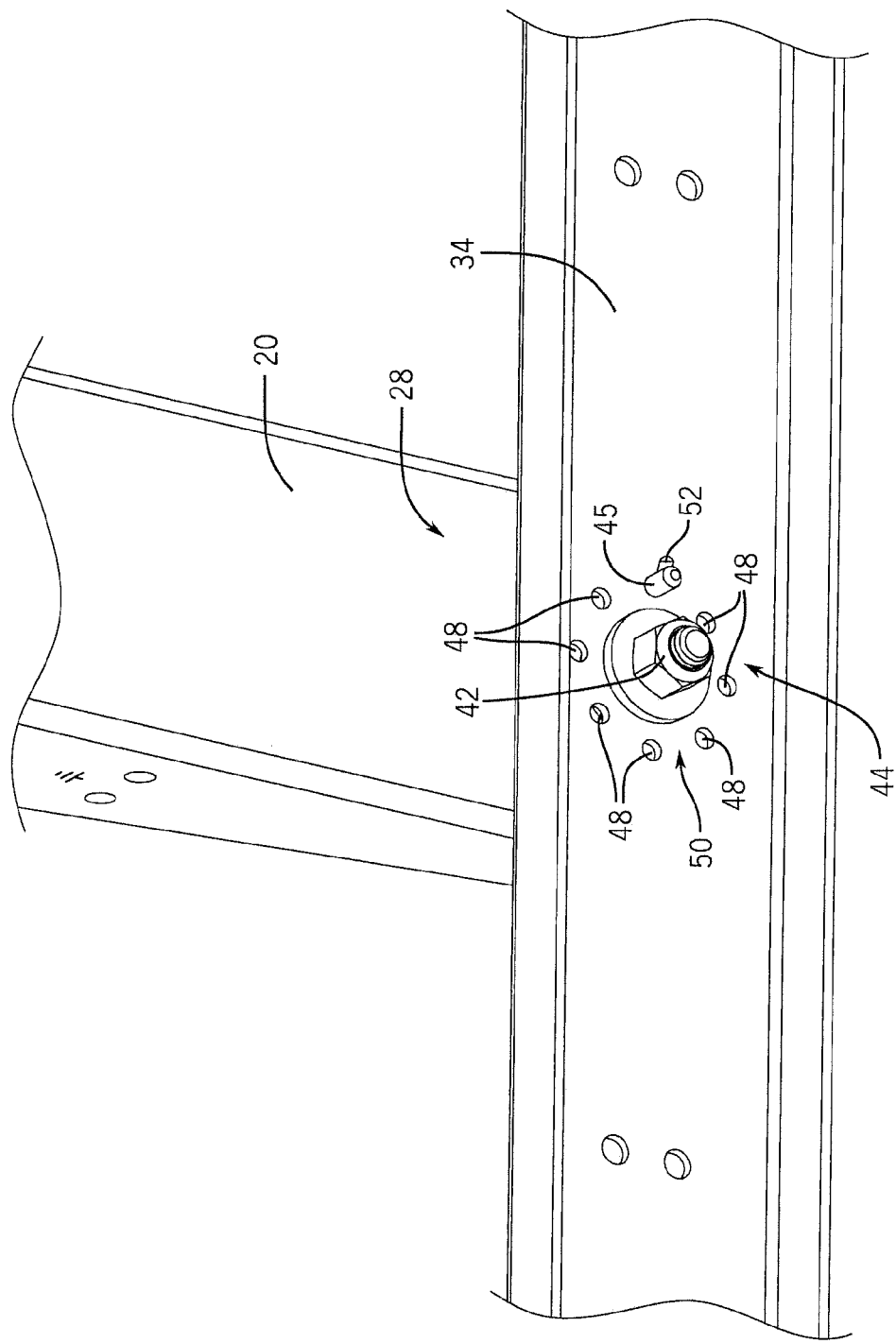
FIG. 6 is a detailed view taken along line 6-6 from FIG. 5.

As best shown in FIGS. 4-6, the swing-out wall rack 10 can also include a locking pin 45. The locking pin 45 allows the rack 16 to be locked in multiple rotatable orientations with respect to the frame 14. The locking pin 45 can pass through a clearance hole 46 in the first horizontal aim 20 of the frame 14. The top side 34 of the rack 16 can include a plurality of locking holes 48 configured in an annular path 50. The clearance hole 46 and the locking pin 45 can be located along the annular path 50 such that as the rack 16 rotates with respect to the frame 14, the locking pin 45 selectively engage one of the plurality of locking holes 48 to lock the rack 16 with respect to the frame 14.

As shown in FIG. 6, the locking pin 45 can include a detent 52 as is known in the art that can engage the selected locking hole 48 when the locking pin 45 is released by the user. To unlock the swing-out wall rack 10, the user merely pulls up on the locking pin 45 to release the detent 52 and engagement between the locking pin 45 and the selected locking hole 48, allowing the rack 16 to be rotated again with respect to the frame 14. Although there are eight locking holes 48 arranged in the annular path 50 in the top side 34 of the rack 16, it is contemplated that other amounts of locking holes 48 could be used. Furthermore, it is contemplated that other sides 36, 38, 40 of the rack 16 can include locking holes 48 depending on the orientation and desired rotation of the rack 16 with respect to the frame 14. For example, the embodiment shown in FIGS. 1-6 has locking holes 48 configured in an annular path 50 on the bottom side 36 of the rack 16. If desired, more than one locking pin 45 could be used with the swing-out wall rack 10.

The swing-out wall rack 10 can also include a mounting hook 54. The mounting hook 54 can allow a single user to couple the frame 14 to the wall. As illustrated in FIGS. 2 and 3, the mounting hook 54 can include a hook portion 56 and a mounting portion 58. The mounting portion 58 can include mounting holes 60 to fasten the mounting hook 54 to the wall 12. Thus, before installing the swing-out wall rack 10 to the wall 12, the user can fasten the mounting hook 54 to the wall 12.

The frame 14 of the swing-out wall rack 10 can include a mounting passage 62 to engage the mounting hook 54. The mounting passage 62 can be located on the vertical member 18 of the frame 14. Once the mounting hook 54 is coupled to the wall 12, the user can mount the frame 14 of the swing-out wall rack 10 on the mounting hook 54 by inserting the hook portion 56 through the mounting passage 62. The user can level the frame 14 of the swing out wall rack 10 and couple the frame 14 to the wall 12 with fasteners through the fastener openings 24. Thus, a user can single handedly mount the frame 14 and rack 16 of the swing-out wall rack 10 to the wall 12 by themselves with the use of the mounting hook 54.

Figure 7:
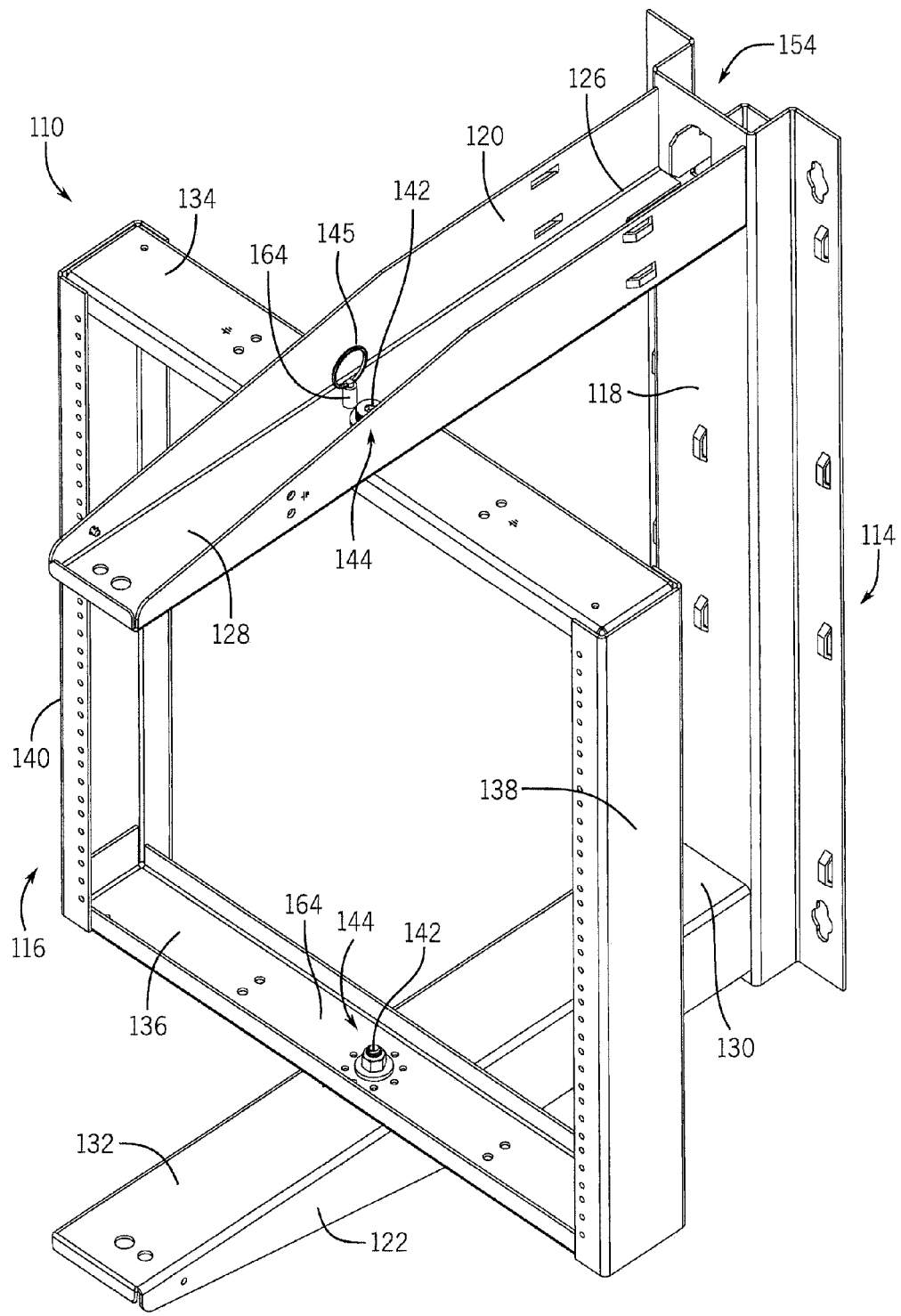
FIG. 7 is a top, right perspective view of a second embodiment of a center pivot swing-out wall rack.
Figure 8:
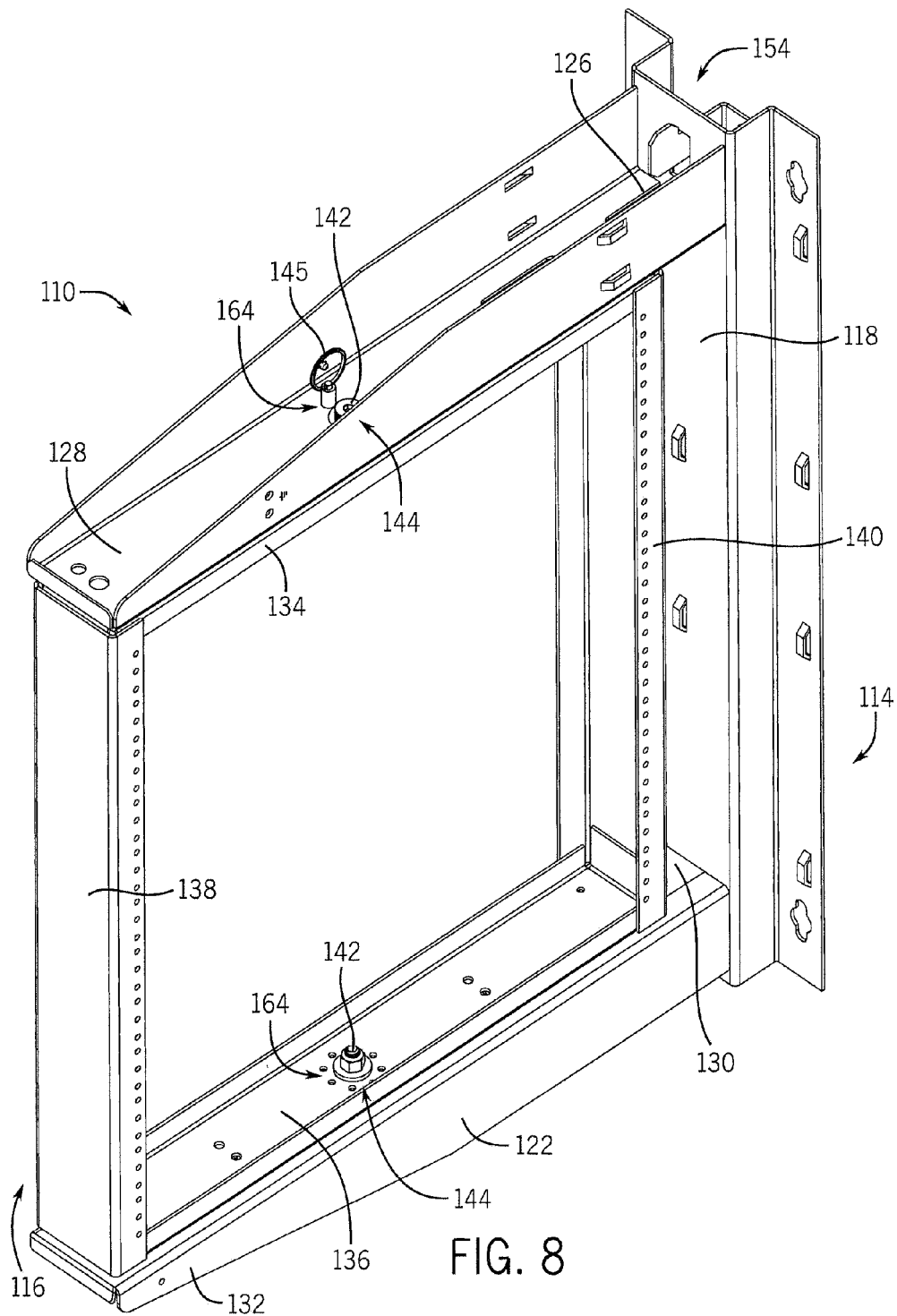
FIG. 8 is a top, right perspective view of the second embodiment of a center pivot swing-out wall rack of FIG. 7, where the rack is rotated 90° with respect to the frame.

FIGS. 7 and 8 illustrate a second embodiment of a swing-out wall rack 110. The swing-out wall rack 110 is generally constructed the same as the swing-out wall rack 10 described above, so only the differences in the swing-out wall rack 110 will be explained. The swing-out wall rack can include a frame 114, a rack 116, a vertical member 118, a first horizontal arm 120, and a second horizontal arm 122. The rack 116 can be rotatably coupled to the first horizontal member 120 and the second horizontal member with fasteners 142 about a mid-point 144 of the rack 116. The rack 116 is coupled to first horizontal arm 120 substantially near a mid-point 164 between the proximal end 126 and the distal end 128 of the first horizontal arm 120. Similarly, the rack 116 is coupled to the second horizontal arm 122 substantially near a mid-point 164 between the proximal end 130 and the distal end 132 of the second horizontal arm 122. As shown in FIG. 8, such a coupling of the rack 116 and frame 114 allows the rack 116 to be rotated approximately 90° with respect to the frame 114 into a compact size. For example, the first side 138 of the rack does not extend beyond the distal ends 128, 132 of the first and second horizontal arms 120, 122. Additionally, the swing-out wall rack 110 can be completely assembled when shipped, reducing the time for installation at the desired location. The rack 116 can also be locked in more than one rotatable orientation with respect to the frame, as discussed above with respect to swing-out wall rack 10, by including a locking pin 145 and associated locking holes 148. The swing-out wall rack 110 can also include a mounting hook 154. The mounting hook 154 can include a hook portion and a mounting portion.

The center pivot swing-out wall rack 10, 110 provides several advantages due to its center pivot structure. For example, by rotatably coupling the rack 16, 116 to the frame 14, 114 substantially about a mid-point 44, 144 of the rack 16, 116, the moment arm on the rack 16, 116 generated from the weight of electronic equipment (not shown) attached to the rack 16, 116 can be virtually eliminated. Additionally, the moment arm on the first and second horizontal arms 20, 120, 22, 122 can also virtually be eliminated for the same principle. Furthermore, the first and second horizontal arms 20, 120, 22, 122 can each carry a portion of the weight of the electronic equipment (not shown) on the racks 16, 116.

FIGS. 9A, 9B, 10A, and 10B illustrate a third embodiment of a swing-out wall rack 210. The swing-out wall rack 210 is generally constructed the same as the swing-out wall rack 10 described above, so only the differences in the swing-out wall rack 210 will be explained. The swing-out wall rack can include a frame 214, a rack 216, a vertical member 218, a first horizontal fixed arm 220, a first horizontal telescoping arm 221, a second horizontal fixed arm 222, and a second horizontal telescoping arm 223. The horizontal fixed arms 220, 222 and the horizontal telescoping arms 221, 223 cooperate as nested telescoping arms which allow for movement of the telescoping arms 221, 223 in the horizontal direction. The rack 216 can be rotatably coupled to the first horizontal telescoping arm 221 and the second horizontal telescoping arm 223 with fasteners 242. The top side 234 of the rack 216 can receive a fastener 242 to couple to the distal end 228 of the first horizontal telescoping arm 221. The bottom side 236 of the rack 216 can receive a fastener 242 to couple to the distal end 232 of the second horizontal arm 222. It is contemplated that the rack 216 need not be coupled to both the first horizontal telescoping arm 221 and the second horizontal telescoping arm 223. Additionally, it is also contemplated that the rack 216 could be modified to be coupled to the frame 214 at the first side 238 and/or the second side 240.

Figures 10A, 10B:
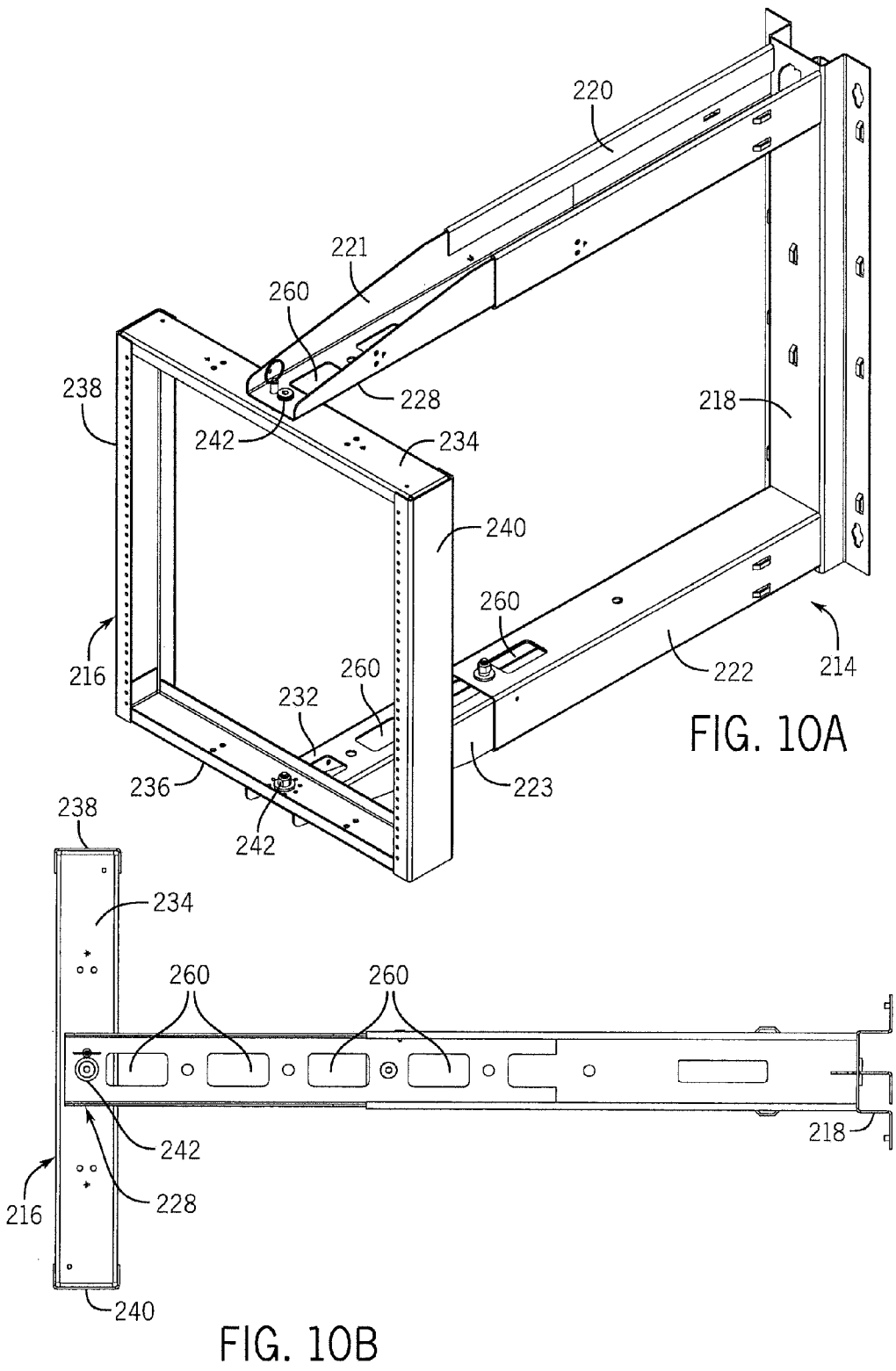
FIG. 10A is a top, right perspective view of the center pivot swing-out wall rack of FIG. 9A, where the horizontal telescoping arms are in an extended position.
FIG. 10B is a top view of the center pivot swing-out wall rack of FIG. 10A.

Electronic equipment (not shown) can be coupled to the rack 216 as is known in the art. Cables (not shown) connecting to the electronic equipment on the rack 216 can be managed via openings or cutouts 260 in the first horizontal fixed arm 220, the first horizontal telescoping arm 221, the second horizontal fixed arm 222, and/or the second horizontal telescoping arm 223. These cutouts 260 are pass-through openings for electrical cables or wires when are then run within the arms 220, 221, 222, 223 as needed for cable management. There can be one or more cutouts 260 in each of the arms 220, 221, 222, 223. Further, the cutouts 260 in the telescoping arms 221, 223 are substantially the same size as corresponding openings in the fixed arms 220, 222 to allow the cutouts 260 in the respective arms 220, 221, 222, 223 to align and allow for cables to pass through. FIGS. 9A and 9B show a perspective view and top view respectively of this embodiment of the swing-out wall rack where the telescoping arms 221, 223 are in a retracted position with respect to the fixed horizontal arms 220, 222. FIGS. 10A and 10B show a perspective view and top view respectively of this embodiment of the swing-out wall rack where the telescoping arms 221, 223 are in an extended position with respect to the fixed horizontal arms 220, 222.

The center pivot swing-out wall rack 210 provides several advantages due to its cable management system. For example, having the cable management in the center of the rack 210 rather than running the wiring along the side of the rack 210 provides an advantage for organization of the wiring. Also, there are no additional parts or accessories needed for cable management because the interior space of the arms 220, 221, 222, 223 is used. Further, in an embodiment where the frame 214 can be telescoping, a user can have infinite adjustment of where the rack 216 is rotatably coupled to the frame 214. While the above description and FIGS. 9A, 9B, 10A and 10B show an embodiment including both the telescoping arm feature and the cable management feature, it is understood that either one or both of these features can be implemented in a single embodiment of the center pivot swing-out wall rack.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A swing-out wall rack for mounting electrical equipment, the swing-out wall rack comprising:
a frame configured to couple to a wall; wherein the frame comprises:
a vertical member; a plurality of fastener openings disposed through the vertical member, each fastener
opening of the plurality of fastener openings receiving a corresponding fastener to couple the frame directly to the wall when the vertical member is disposed against the wall;
a mounting passage disposed through the vertical member, the swing-out wall rack further comprising a mounting hook configured to be coupled to the wall and to receive the frame by passing through the vertical member via the mounting passage, thereby mounting the swing-out wall rack to the wall for coupling to the wall; a first horizontal arm having a proximal end and a distal end and being coupled to the vertical member at the proximal end;
wherein the frame further includes a second horizontal arm, the second horizontal arm including a proximal end and a distal end, the proximal end of the second horizontal arm coupled to the vertical member such that the second horizontal arm is spaced from the first horizontal arm and substantially parallel to the first horizontal arm; and
a rack configured to store electrical equipment, the rack having a width and a mid-point of the width, the rack rotatably coupled at the mid-point to the first and second horizontal arms.

2. The swing-out wall rack of claim 1, wherein the rack is rotatably coupled to the first horizontal arm substantially near the distal end of the first horizontal arm.

3. The swing-out wall rack of claim 1, wherein:
the first horizontal arm comprises a first hole near the distal end;
the second horizontal arm comprises a second hole near the distal end; and
the rack comprises a top side and a bottom side each including the mid-point of the rack, the top side comprising a third hole at the mid-point of the rack and the bottom side comprising a fourth hole at the mid-point of the rack, the rack being rotatably coupled to the first horizontal arm by a first fastener passing through the first hole and the third hole, and the rack being rotatably coupled to the second horizontal arm by a second fastener passing through the second hole and the fourth hole.

4. The swing-out wall rack of claim 1, wherein the rack is rotatably coupled to the first horizontal arm substantially near a mid-point between the proximal end and the distal end of the first horizontal arm.

5. The swing-out wall rack of claim 4, wherein the rack is rotatably coupled to the second horizontal arm substantially near a mid-point between the proximal end and the distal end of the second horizontal arm.

6. The swing-out wall rack of claim 5 wherein the rack has a rotatable orientation that gives the swing-out wall rack a compact size, the rack in the rotatable orientation being parallel to the first horizontal arm and the second horizontal arm and not extending beyond the distal ends of the first horizontal arm and the second horizontal arm.

7. The swing-out wall rack of claim 1, wherein the first horizontal arm is configured to rotatably couple to the rack at a first location substantially near the distal end of the first horizontal arm and at a second location substantially near a mid-point of the first horizontal arm.

8. The swing-out wall rack of claim 1, wherein the rack is lockable against the first horizontal arm at a plurality of orientations with respect to the frame.

9. The swing-out wall rack of claim 8, wherein the plurality of orientations includes a first orientation and a second orientation disposed 90 degrees from the first orientation.

10. The swing-out wall rack of claim 9, wherein the plurality of orientations includes one or more 45 degree increments between the first orientation and the second orientation.

11. The swing-out wall rack of claim 1, wherein the rack is lockable at a plurality of orientations with respect to the frame.

12. The swing-out wall rack of claim 1 further comprising:
one or more locking pins configured to selectively lock the rack against the frame in one of a plurality of orientations with respect to the frame.

13. The swing-out wall rack of claim 12 further comprising a plurality of locking holes configured in a path such that as the rack rotates with respect to the frame, one or more of the locking pins selectively engages one of the plurality of locking holes to lock the rack in one of the plurality of orientations with respect to the frame.

14. The swing-out wall rack of claim 13 wherein one or more of the locking pins engages with one or more of the locking holes to provide the plurality of orientations at discrete angles throughout a 360 degree rotation of the rack with respect to the frame.

15. The swing-out wall rack of claim 14 wherein the discrete angles of the plurality of orientations are spaced 45 degrees apart from each other.

16. The swing-out wall rack of claim 13, wherein the locking holes are disposed in the rack.

17. The swing-out wall rack of claim 16, wherein the locking holes are disposed in an annular path, the one or more locking pins located along the annular path such that as the rack rotates with respect to the frame, the one or more locking pins can engage one of the plurality of holes to lock the rack with respect to the frame.

* * * * *